(12) United States Patent
Zaluski et al.

(10) Patent No.: US 6,325,923 B1
(45) Date of Patent: Dec. 4, 2001

(54) BIOREACTOR FOR ACID MINE DRAINAGE CONTROL

(75) Inventors: Marek H. Zaluski; Kenneth R. Manchester, both of Butte, MT (US)

(73) Assignee: MSE Technology Applications, Inc., Butte, MT (US)

( * ) Notice: Subject to any disclaimer, the term of this patent is extended or adjusted under 35 U.S.C. 154(b) by 0 days.

(21) Appl. No.: 09/545,253

(22) Filed: Apr. 7, 2000

Related U.S. Application Data

(60) Provisional application No. 60/128,485, filed on Apr. 9, 1999.

(51) Int. Cl.[7] .................................................... B01D 33/70
(52) U.S. Cl. ........................ 210/150; 210/170; 210/206; 210/912; 210/615
(58) Field of Search ..................................... 210/150, 151, 210/170, 202, 206, 610, 611, 912, 615, 717

(56) References Cited

U.S. PATENT DOCUMENTS

| | | | |
|---|---|---|---|
| 3,269,542 | * 8/1966 | Renzi et al. ........................... | 210/151 |
| 4,039,437 | * 8/1977 | Smith et al. ........................... | 210/170 |
| 4,354,937 | * 10/1982 | Hallberg ................................ | 210/912 |
| 4,522,723 | * 6/1985 | Kauffman et al. ................... | 210/912 |
| 4,664,804 | * 5/1987 | Morper et al. ........................ | 210/912 |
| 4,797,026 | 1/1989 | Webster . | |
| 4,810,385 | * 3/1989 | Hater et al. ........................... | 210/150 |
| 4,839,052 | * 6/1989 | Maree .................................... | 210/912 |
| 5,076,927 | * 12/1991 | Hunter ................................... | 210/912 |
| 5,344,557 | * 9/1994 | Scanzillo .............................. | 210/170 |
| 5,554,290 | * 9/1996 | Suthersan ............................. | 210/610 |
| 5,587,079 | 12/1996 | Rowley et al. . | |
| 5,637,210 | * 6/1997 | Vail et al. ............................. | 210/150 |
| 5,660,730 | * 8/1997 | Lucchese et al. .................... | 210/912 |
| 5,863,422 | * 1/1999 | Watten ................................... | 210/150 |
| 5,968,359 | * 10/1999 | Krahn et al. .......................... | 210/611 |
| 5,976,372 | * 11/1999 | Vesterager ............................ | 210/912 |

\* cited by examiner

*Primary Examiner*—Christopher Upton
(74) *Attorney, Agent, or Firm*—Ralph F. Crandell

(57) ABSTRACT

A bioreactor for reacting an aqueous heavy metal and sulfate containing mine drainage solution with sulfate reducing bacteria to produce heavy metal sulfides and reduce the sulfuric acid content of the solution. The reactor is an elongated, horizontal trough defining an inlet section and a reaction section. An inlet manifold adjacent the inlet section distributes aqueous mine drainage solution into the inlet section for flow through the inlet section and reaction section. A sulfate reducing bacteria and bacteria nutrient composition in the inlet section provides sulfate reducing bacteria that with the sulfuric acid and heavy metals in the solution to form solid metal sulfides. The sulfate reducing bacteria and bacteria nutrient composition is retained in the cells of a honeycomb structure formed of cellular honeycomb panels mounted in the reactor inlet section. The honeycomb panels extend upwardly in the inlet section at an acute angle with respect to the horizontal. The cells defined in each panel are thereby offset with respect to the honeycomb cells in each adjacent panel in order to define a tortuous path for the flow of the aqueous solution.

11 Claims, 10 Drawing Sheets

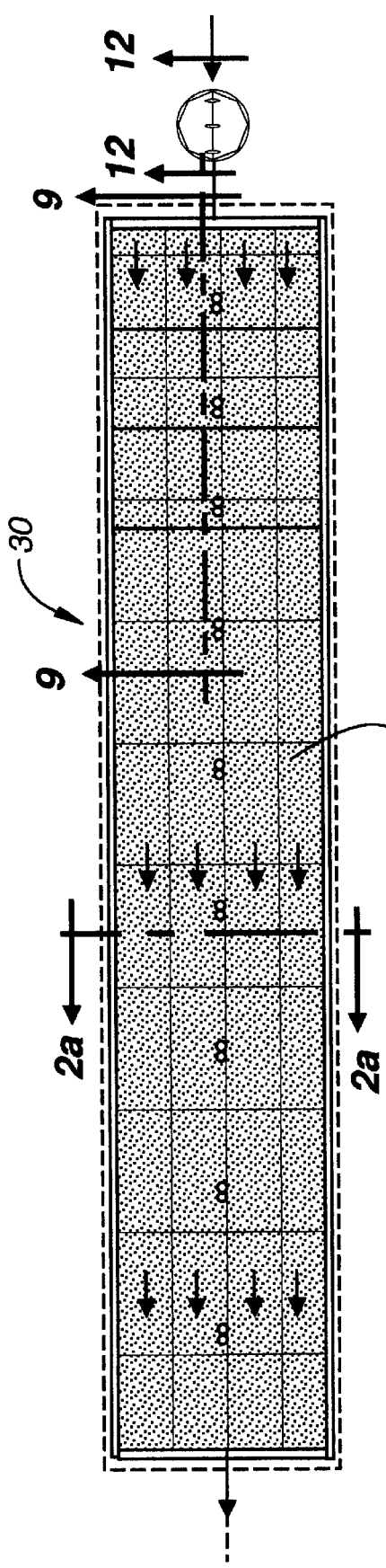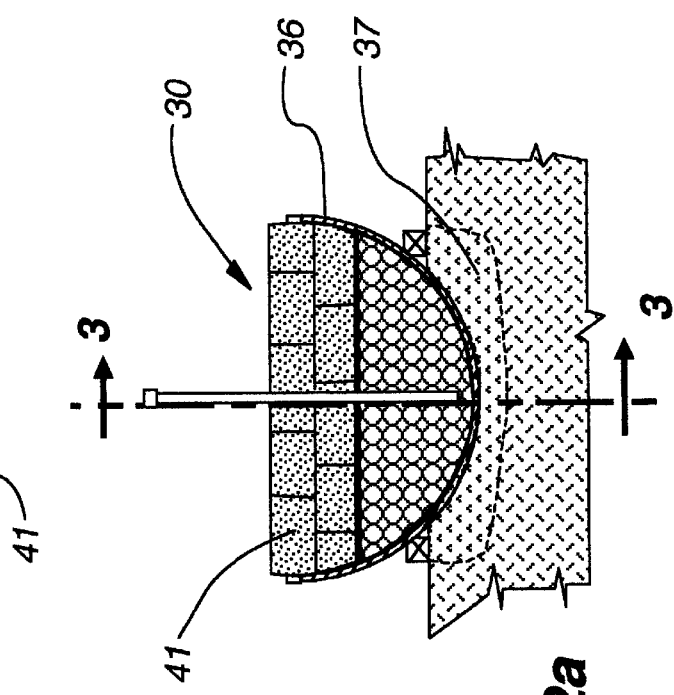
Fig. 1a
Fig. 2a

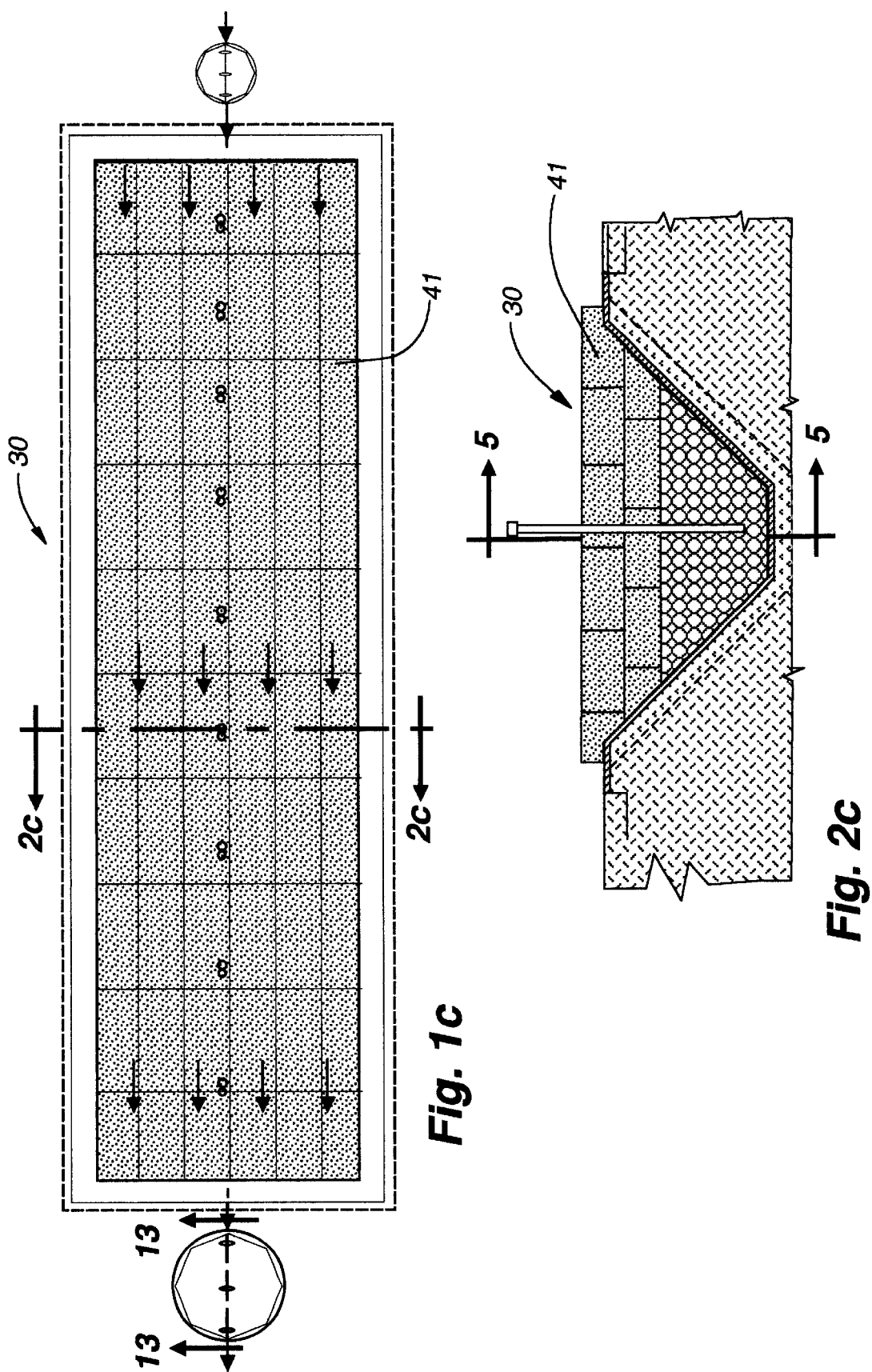

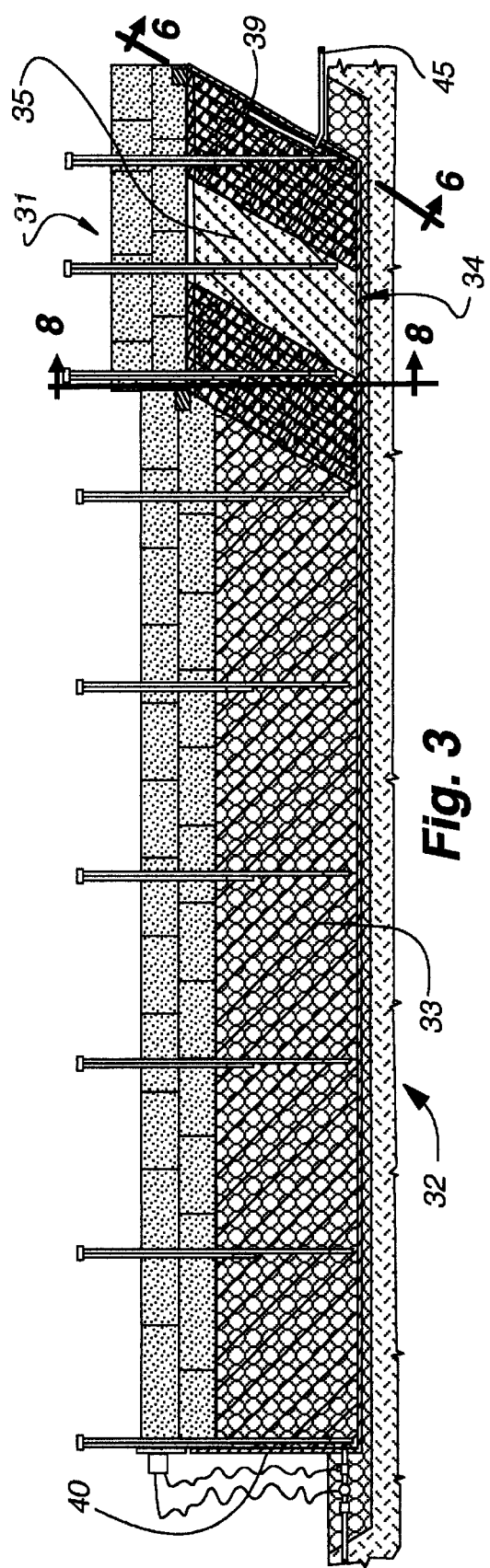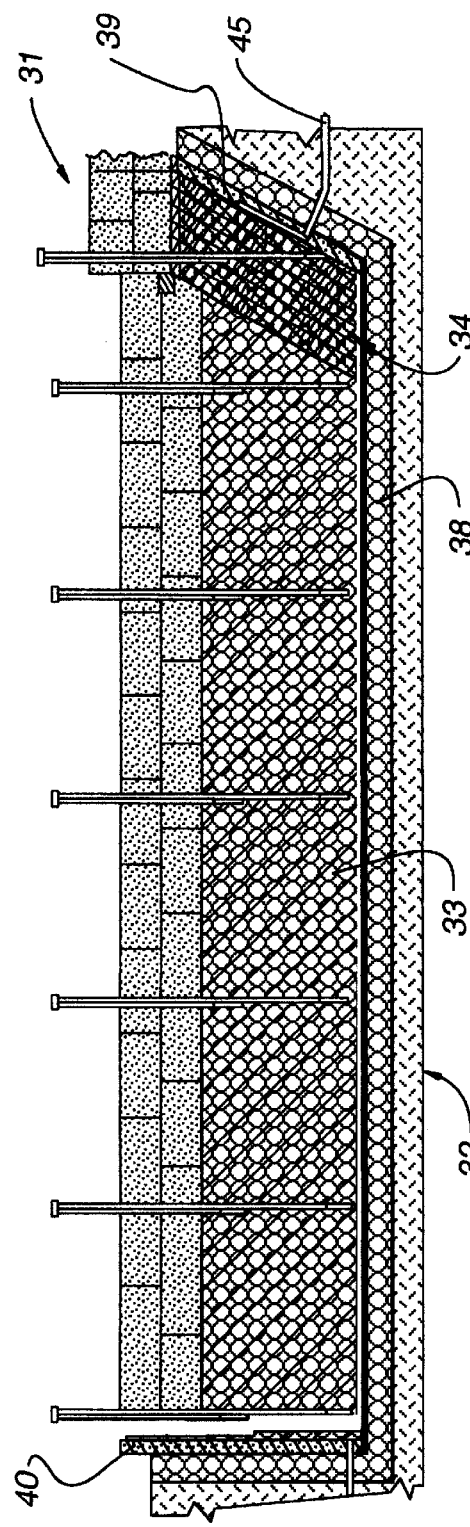

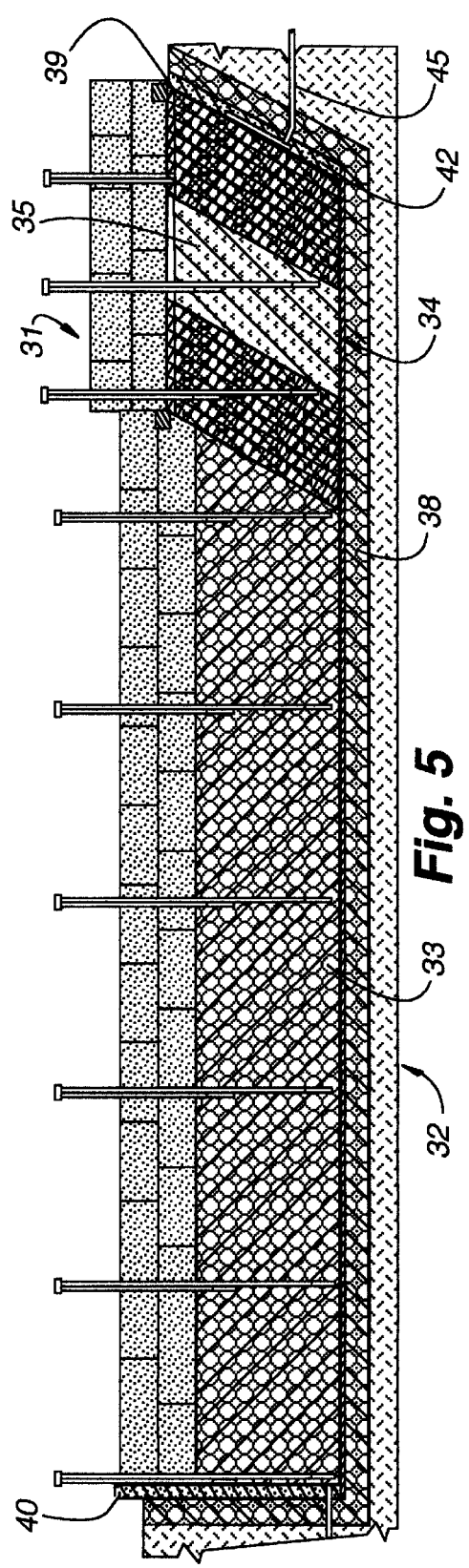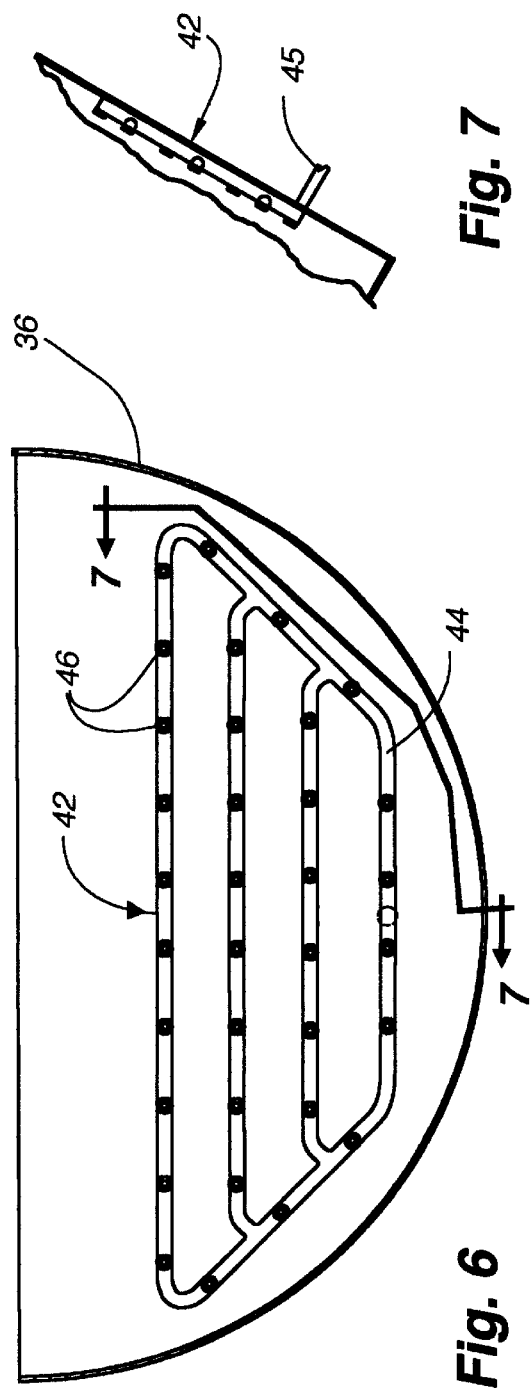

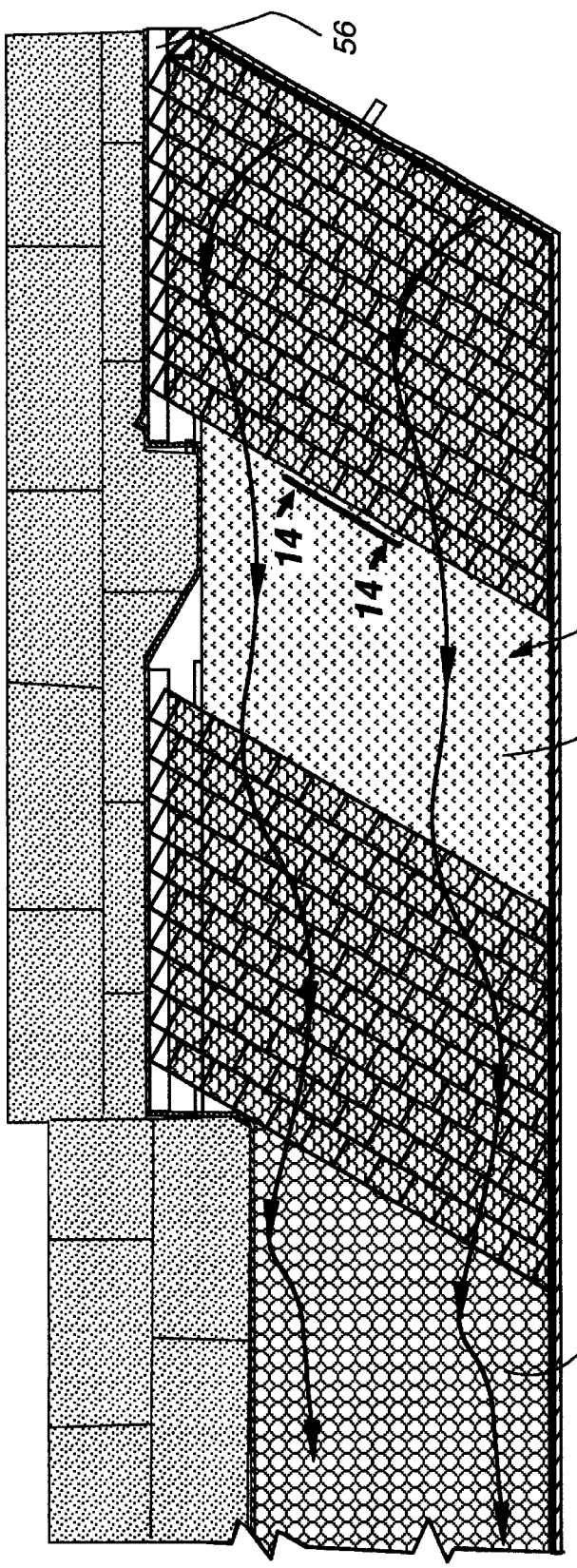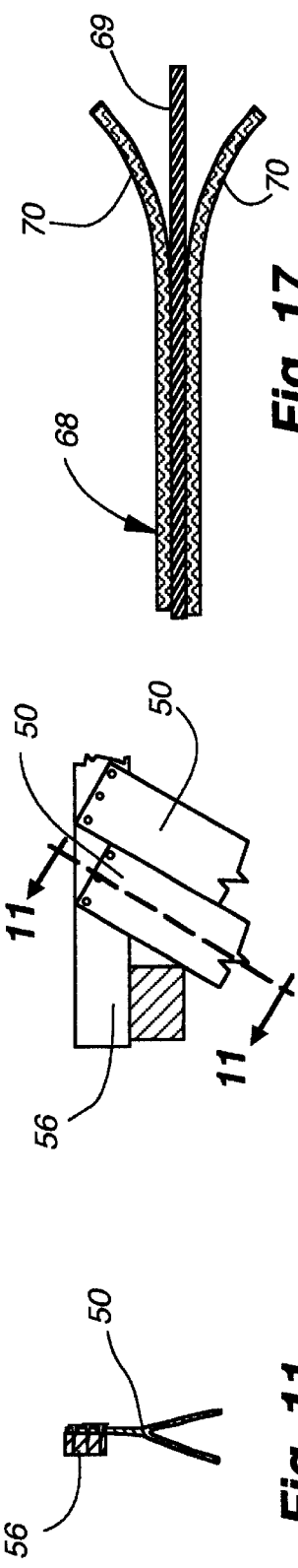

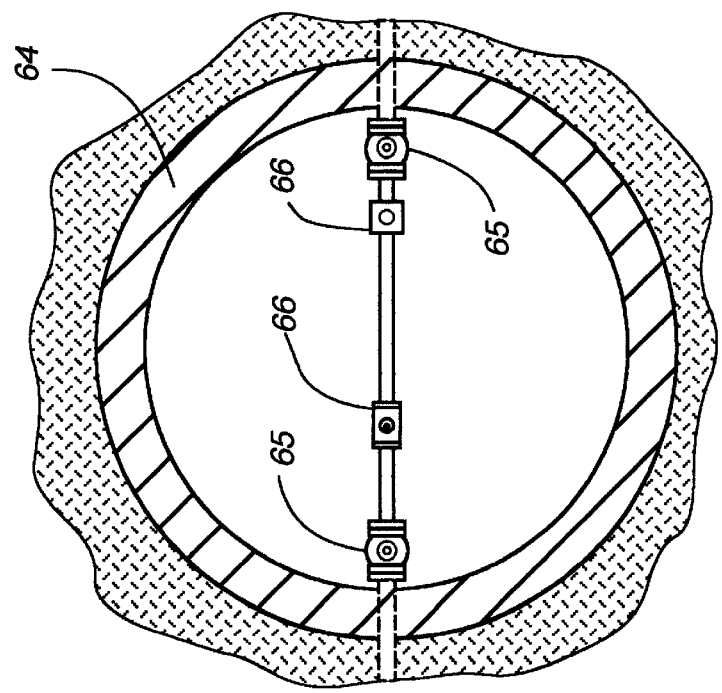
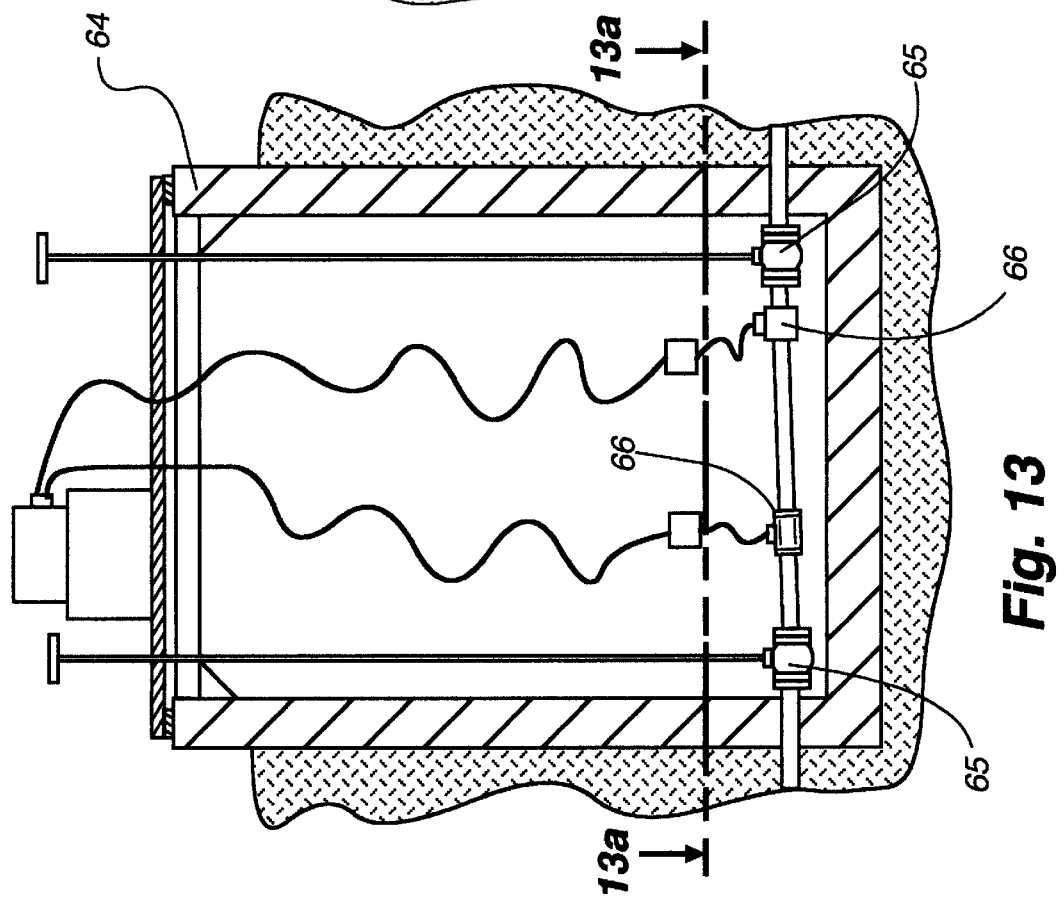
*Fig. 13a*
*Fig. 13*

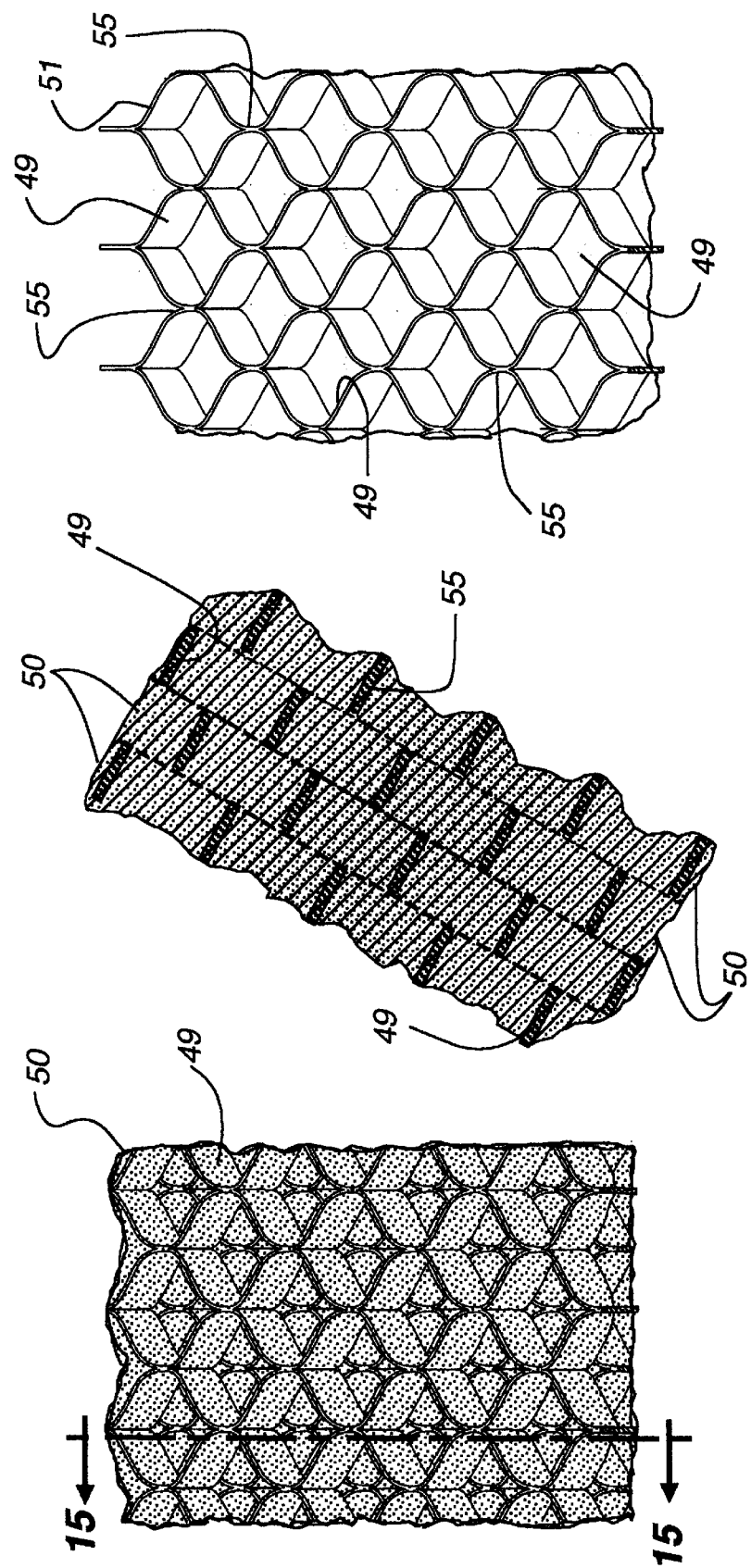

US 6,325,923 B1

BIOREACTOR FOR ACID MINE DRAINAGE CONTROL

CROSS REFERENCE TO RELATED APPLICATION

This application claims the benefit of Provisional Application Ser. No. 60/128,485, filed Apr. 9, 1999, by Marek H. Zaluski and Kenneth R. Manchester for "Bioreactor for Acid Mine Drainage Control." The disclosure of this provisional application is incorporated herein by this reference.

GOVERNMENT CONTRACT RIGHTS

This invention was made with Government support under Contract No. DE-AC22-96EW96405 awarded by the United States Department of Energy, and the Government may have certain rights in this invention.

BACKGROUND OF THE INVENTION

1. Field of the Invention

The present invention relates to a method and apparatus for the in situ treatment of acid mine drainage water or acidic drainage water from mine tailings in order to remove dissolved heavy metal ions and sulfate ions therefrom, and more specifically to a method and apparatus for the foregoing purpose utilizing sulfate reducing bacteria.

2. Statement of the Prior Art

Water flowing from mines percolates through tailings piles, and in the presence of oxygen from the air reacts with the metal sulfides contained in the tailings, such as iron pyrites or iron sulfides, forming soluble metal sulfates and sulfuric acid in the water stream leaving the mine tailings.

The use of sulfate reducing bacteria for producing hydrogen sulfide from a solution containing sulfate ions and metal ions, and the subsequent reaction of the hydrogen sulfide with the metal ions to remove the metal ions from the solution as solid metal sulfides, is an old and well-known process. See U.S. Pat. No. 5,587,079, issued Dec. 24, 1996, to M. V. Rowley, for "Process for Treating Solutions Containing Sulfate and Metal Ions." The chemical reactions involved in the process are described in detail in the Rowley et al. patent. The Rowley et al. patent describes and shows a bioreactor using sulfate reducing bacteria to convert sulfate ions to sulfide ions which in turn react with heavy metals ions in an aqueous solution to produce solid metal sulfides.

OBJECTS OF THE INVENTION

It is the principal object of the present invention to provide an improved bioreactor for reacting sulfate reducing bacteria with heavy metal sulfates and sulfuric acid contained in aqueous solutions such as in acidic aqueous drainage from mines and mine tailings, in order to convert the sulfates to sulfides and produced heavy metal sulfide precipitates, and thereby produce water of substantially reduced heavy metal and sulfate content.

Another object of the present invention to provide a bioreactor of the foregoing character having an improved water permeable bacteria and bacteria nutrient containing structure.

A further object of the present invention is to provide an improved bacteria nutrient containing structure for a bioreactor that reduces settling and packing of the bacteria nutrient medium and enhances contact time of water with the nutrient medium.

SUMMARY OF THE INVENTION

A bioreactor embodying the present invention is formed by an elongated horizontal trough of concrete or half culvert of corrugated steel supported on concrete pads or cradles positioned in ground soil above or below ground level and downstream of a mine drainage collection pond in which aqueous acidic mine drainage containing dissolved heavy metal sulfates and sulfuric acid is collected.

The reactor includes an inlet section in which sulfate reducing bacteria and nutrients therefore, such as cow manure, are supported. The inlet section may also contain other reactants such as limestone for increasing the pH of the drainage solution in order to promote bacterial activity. The bacterial and nutrient materials are retained in the cells of honeycomb panels arranged at an angle with the trough so that the honeycomb cells of adjoining or juxtaposed panels are offset from cells of adjacent panels in order to form a tortuous path for the flow of acid mine drainage solution therethrough.

Mine drainage water with entrained bacteria and nutrients and at the desired pH flows to the outlet or reaction section wherein the bacteria reduce the sulfates in the mine drainage solution to produce hydrogen sulfide which in turn reacts with the heavy metal ions in the solution to form heavy metal sulfide precipitates. The reaction section is a packed bed, rounded river rocks or cobbles being used as packing. The sulfides are deposited on the rocks or cobbles in the trough or washed through and collected in a downstream collection pond. Eventually the sulfide build-up may necessitate the removal and replacement of the cobbles.

The troughs are formed of any appropriate material in any desired cross-sectional configuration and length. One form of trough is constructed of reinforced concrete and is a truncated V-shape in cross-section defining inwardly sloping side walls and a bottom wall or floor. End walls define the ends of the trough or channel. Another form of trough is a long metal culvert hemispherical in cross-section and supported on concrete pads.

DESCRIPTION OF THE DRAWINGS

FIG. 1a is a plan view of a bioreactor embodying the present invention.

FIG. 1c is a plan view of a further modified form of a bioreactor embodying the present invention.

FIG. 2a is a vertical section view taken substantially in the plane of line 2a—2a on FIG. 1a.

FIG. 2c is a vertical section view taken substantially in the plane of line 2c—2c on FIG. 1c.

FIG. 3 is a longitudinal elevational vertical section view taken substantially in the plane of line 3—3 on FIG. 2a.

FIG. 4 is a longitudinal elevational vertical section view taken substantially in the plane of line 4—4 on FIG. 2b.

FIG. 5 is a longitudinal elevational vertical section view taken substantially in the plane of line 5—5 on FIG. 2c.

FIG. 6 is an enlarged vertical section view taken substantially in the plane of line 6—6 on FIG. 3.

FIG. 7 is a section view taken substantially in the plane of line 7—7 on FIG. 6.

FIG. 9 is an enlarged section view taken substantially in the plane of line 9—9 on FIG. 1a.

FIG. 10 is enlarged partial elevational view showing honeycomb sections attached to a support beam.

FIG. 11 is a section view taken substantially in the plane of line 11—11 on FIG. 10.

FIG. 13 is an enlarged section view taken substantially in the plane of line 13—13 on FIG. 1c.

FIG. 13a is a section view taken substantially in the plane of line 13a—13a on FIG. 13.

FIG. 14 is an enlarged section view taken substantially in the plane of line 14—14 on FIG. 9.

FIG. 15 is a section view taken substantially in the plane of line 15—15 on FIG. 14.

FIG. 16 is a perspective view of a single honeycomb panel.

FIG. 17 is a section view of a laminated sheet material used to form a liner for the concrete V-shaped or half-culvert trough.

DESCRIPTION OF THE PREFERRED EMBODIMENT

Figures 1B, 2B:
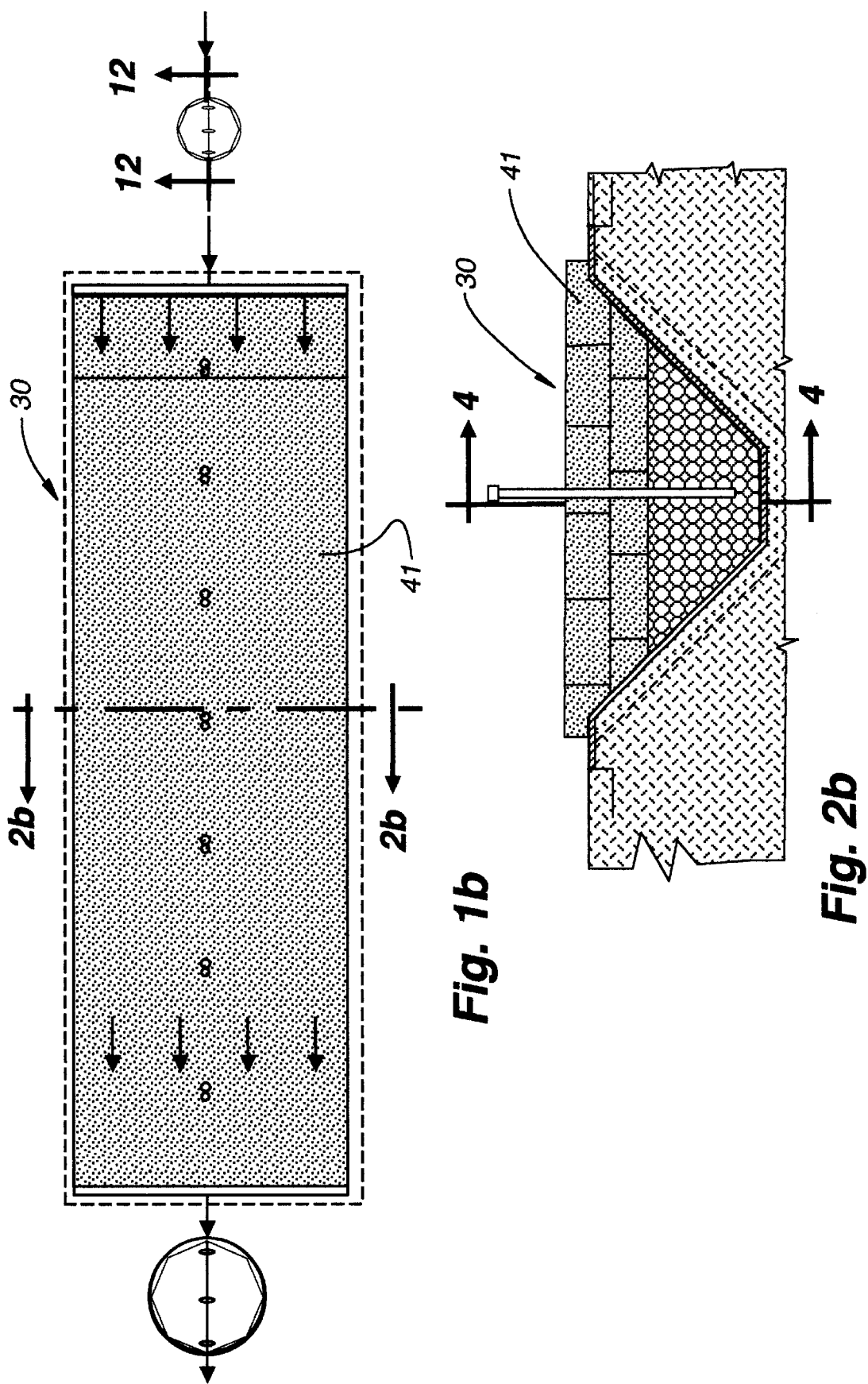
FIG. 1b is a plan view of a modified form of bioreactor embodying the present invention.
FIG. 2b is a vertical section view taken substantially in the plane of line 2b—2b on FIG. 1b.

The present invention is embodied in an elongated, horizontal, packed bed bioreactor 30 for biologically removing heavy metals from metal sulfate and sulfuric acid containing acid mine drainage aqueous solutions. Three closely similar modifications of the bioreactor 30 are shown in FIGS. 1a, 1b, and 1c. In each modification, as shown in FIGS. 3, 4, and 5, the bioreactor is formed in two elongated, consecutively joined sections, an inlet section 31 containing sulfate reducing bacteria and organic carbon nutrients therefor, and a reaction or outlet section 32 comprising a bed packed with rock or stone such as rounded river rock or cobbles 33. The inlet section 31 of the reactor may also contain an intermediate section 34 in which the pH of the acid mine drainage solutions is increased by reaction with limestone chunks or particulates 35 to adjust the pH of the solution in order to promote the activity of the sulfate reducing bacteria.

The bioreactors shown in FIGS. 1a, 1b, and 1c differ from each other primarily in that the reactor shown in FIG. 1a is an above-ground reactor, while the reactors shown in FIGS. 1b and 1c are positioned below ground level. The reactors shown in FIGS. 1a and 1c include the pH adjustment material 35 in an intermediate section 34 of the inlet section 31, while the reactor shown in FIG. 1b does not. The reactor shown in FIG. 1a is in the form of a half-culvert metal trough 36, supported on blocks or cradles 37 mounted at ground level, while the reactors shown in FIGS. 1b and 1c are in the form of truncated V-shaped concrete troughs 38 formed in a trenches in the ground. The reactors are closed at each end by inlet and outlet end panels 39, 40 which are either metal or concrete. The reactors are covered by bales 41 of straw or hay. In all other respects the reactors are substantially the same and will be described together. The operative features of the reactors are identical.

Figure 8:
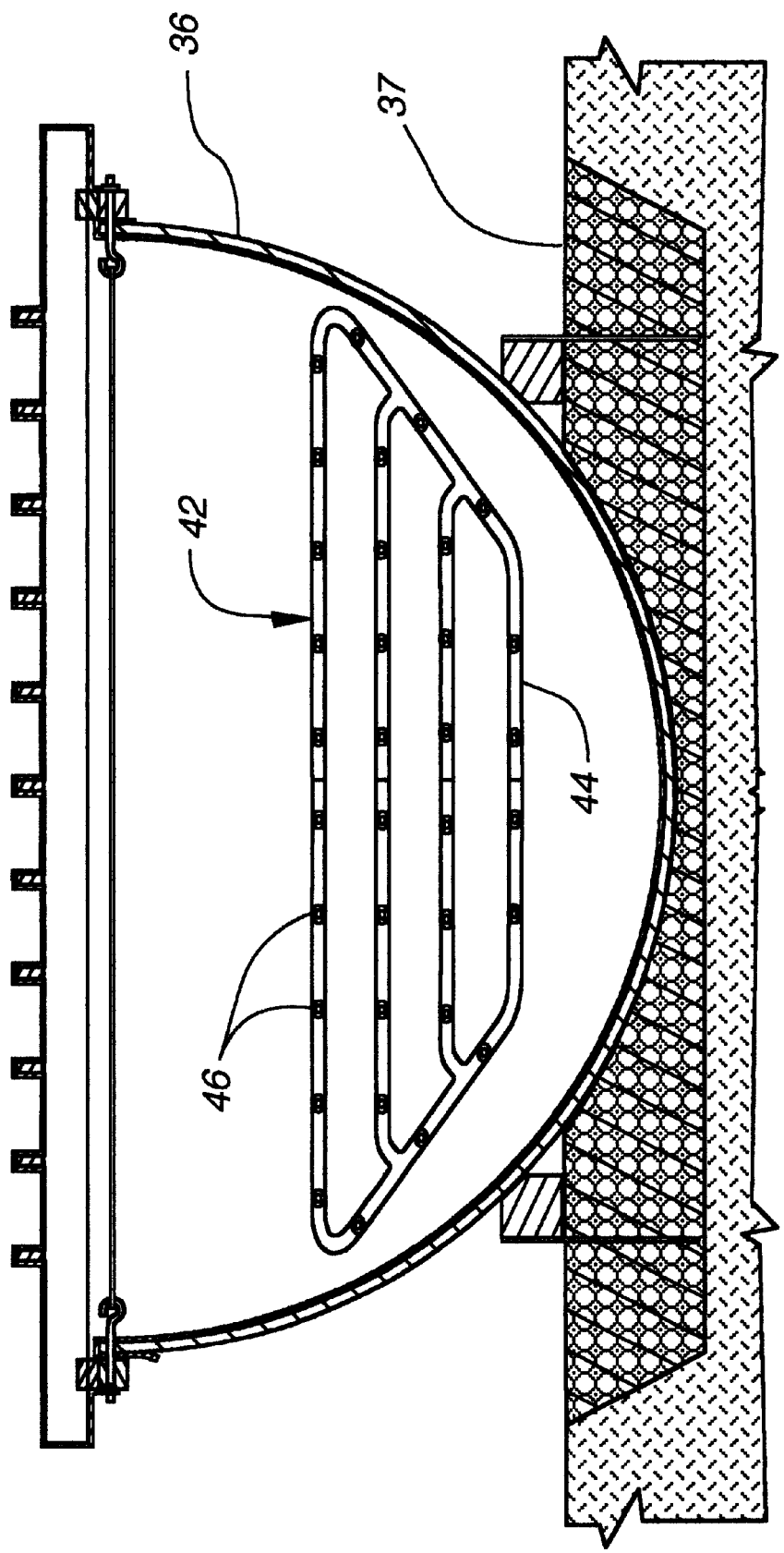
FIG. 8 is an enlarged section view taken substantially in the plane of line 8—8 on FIG. 3, with the intermediate honeycomb panels and pH reactant omitted for clarity.
Figure 12:
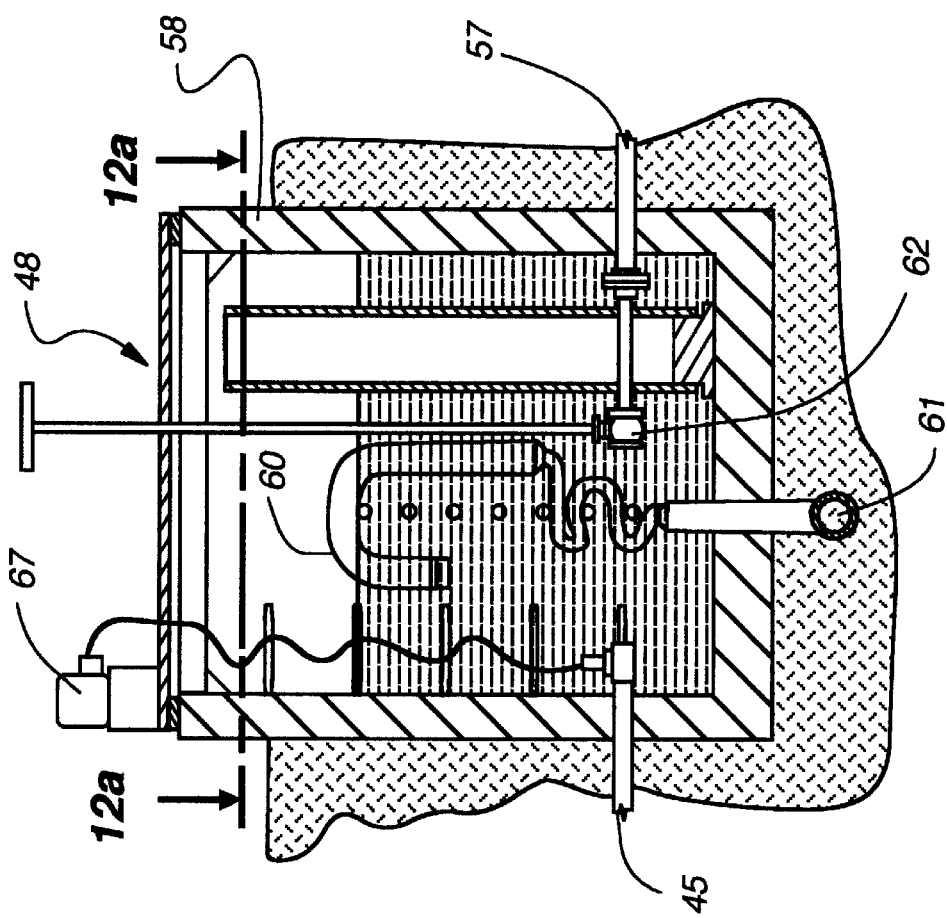
FIG. 12 is an enlarged section view taken substantially in the plane of line 12—12 on FIG. 1b.
Figure 12A:
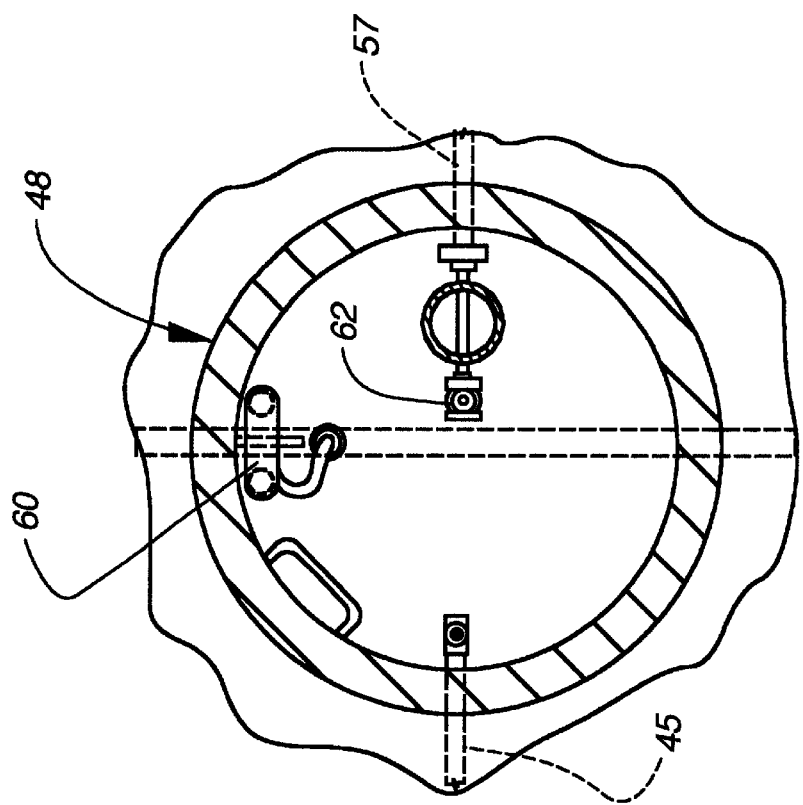
FIG. 12a is a section view taken substantially in the plane of line 12a—12a on FIG. 12.

For distributing acidic mine drainage water into the reactor 30, the reactor is formed with an inlet manifold 42 on its inlet end panel 39 as shown in FIGS. 6, 7 and 8. The manifold 42 is formed by a continuous conduit 44 with an inlet pipe 45 and a plurality of spaced outlet nozzles 46. The inlet pipe receives acidic mine drainage water from a sump 48 which in turn receives the water from a collection pond (not shown) below the mine opening and tailings pile. Water from the mine and tailings pile collects in the collection pond either for further runoff or distribution through the bioreactor.

Acidic mine drainage water from the nozzles 46 flows into the inlet section 31 of the reactor and through a source of sulfate reducing bacteria and suitable nutrients. The bacterial and nutrient composition, such as a mixture of cow manure and hay or straw, is water permeable so that the flow of acidic mine drainage effectively leaches the nutrient to promote the reaction of the bacteria with the sulfates in the flowing solution.

In order to prevent the bacteria source and organic material from compacting with a resultant loss of permeability to the flow of water, the material is confined in a plurality of cells 49 defined in a plurality of juxtaposed honeycomb panels 50. The honeycomb panels 50 are layered in the inlet section of the trough at an acute angle with respect to the horizontal so that the respective cells 49 of adjacent panels 50 are not directly aligned. With such an arrangement, water must follow a tortuous path through the honeycomb cells 49, thereby preventing channeling and packing of the biomaterial.

The honeycomb panels 50 defining the cells 49, as shown in FIG. 16, are formed of layers or strips 51 of flexible, fabric-like materials. The strips 51 defining the honeycomb panel are joined by alternating spaced apart glue lines or seams 55 so that when the joined strips are separated or pulled apart, a cellular honeycomb panel is formed.

A useful honeycomb panel and method of manufacture is described in detail in U.S. Pat. No. 4,797,026 and is available commercially under the trademarks "Terracell" or "Terra Grid," a non-metallic fabric honeycomb product of Webtec, Inc. Such honeycomb materials have been commercially utilized for soil and aggregate confinement and erosion control.

The honeycomb panels are supported in the trough from cross beams 56 to which the honeycomb strips 51 are affixed, as shown in FIGS. 10 and 11. The cross beams 56 extend across and are supported on the upper edges of the trough with the honeycomb panels extending downwardly into the trough and at an acute angle with respect to the horizontal trough. One or more sections of honeycomb panels 50 are provided between which an intermediate section 33 containing an alkaline material such as limestone may be provided for pH control.

The cells 49 of the honeycomb panels 50 are each filled with a nutrient material that also contains sulfate reducing bacteria. The honeycomb cells 49 are manually packed with the nutrient containing material after positioning a honeycomb panel in the trough. When the cells 49 of one panel 50 have been filled, the next panel 50 is mounted in place and packed in a like manner. Water flowing through the nutrient material must follow a tortuous or irregular path, as shown in FIG. 9, which prevents channeling and enhances the pick-up of nutrients in the flowing water.

After the acid mine drainage solution passes through the material in the honeycomb cells 49 providing nutrient and bacteria, it flows slowly through the reaction or outlet section 32 and over and around cobblestones or river rock 33 while the sulfate reducing reaction takes place. Heavy metal sulfides thus formed settle to the bottom of the reactor trough or are washed out of the reactor and collected in a collection pond (not shown).

As referred to above, aqueous acid mine drainage from a mine and its tailings is collected in a pond from which it is fed through an inlet conduit 57 to an inlet sump 58, shown in FIGS. 1a, 1b, 1c, 12 and 12a, which serves to create a hydraulic head to the reactor manifold 42 and control the liquid level in the reactor. Acid mine drainage flows through the outlet pipe 59 from the inlet sump 58 into the inlet pipe 45 of the reactor 30. The sump includes a level control pipe 60 connected to a drain conduit 61. Flow from the inlet conduit 57 into the sump 58 is controlled by a valve 62. A pH meter 63 can be provided to monitor the acid level of the mine drainage solution. The liquid level in the sump 58 determines the liquid level in the reactor 30.

As shown in FIGS. 13 and 13a, an outlet valve and control box 64 may be provided at the outlet of the reactor. Outlet control valves 65 are provided together with monitoring devices 66 such as a pH meter, and the like.

The half-culvert 36 or trough 38 may be lined with a liner 68 of the character shown in FIG. 17. This liner is formed with a layer 69 of a water impermeable sheet with outer layers 70 of woven fabric laminated thereto.

While certain illustrative embodiments of the present invention have been shown in the drawings and described above in considerable detail, it should be understood that there is no intention to limit the invention to the specific forms disclosed. On the contrary, the intention is to cover all modifications, alternative constructions, equivalents and uses falling within the spirit and scope of the invention as expressed in the appended claims.

What is claimed is:

1. A bioreactor for reacting an aqueous heavy metal and sulfate containing solution with a sulfate reducing bacteria, comprising:

an elongated horizontal trough defining an inlet section and a reaction section;

said inlet section comprising a honeycomb structure defining cells;

said cells containing said sulfate reducing bacteria;

bacteria nutrient composition in said cells;

an inlet manifold adjacent said inlet section for distributing said aqueous solution into said inlet section for flow through said inlet section and said reaction section;

said solution acquiring said bacteria in said inlet section and said bacteria reacting with said solution in said reaction section to form heavy metal sulfides; and a solution outlet from said reaction section for discharging said solution after reduction of said sulfates.

2. A bioreactor as defined in claim 1 wherein said honeycomb structure comprises a plurality of honeycomb panels, each said panel defining a plurality of cells, said panels being positioned in juxtaposed relation and with the honeycomb cells defined in each panel being offset with respect to the honeycomb cells in each adjacent panel whereby said cells define a tortuous path for said aqueous solution flowing through said honeycomb panels.

3. A bioreactor as defined in claim 2 wherein said honeycomb panels extend upwardly in said inlet section at an acute angle with respect to the horizontal.

4. A bioreactor as defined in claim 1 wherein said trough further defines an alkaline reagent section in said inlet section, and a particulate alkaline reagent in said alkaline reagent section.

5. A bioreactor as defined in claim 1 further comprising an aqueous solution sump adjacent said inlet section for retaining and supplying a continuous flow of aqueous mine drainage solution to said manifold.

6. A bioreactor as defined in claim 1 wherein said trough is truncated V-shaped in cross-section.

7. A bioreactor as defined in claim 1 wherein said trough is semi-circular in cross-section.

8. A bioreactor as defined in claim 1 wherein said reaction section is a packed bed.

9. A bioreactor as defined in claim 8 wherein said bed is packed with cobbles.

10. A bioreactor as defined in claim 1 wherein said bacteria and nutrient composition comprises cow manure.

11. For use in a bioreactor, including an elongated horizontal reaction trough defining an inlet section and a reaction section, for reacting an aqueous acidic heavy metals and sulfate containing solution with a sulfate reducing bacteria, a bacteria and bacteria nutrient composition containing honeycomb cell structure positioned in said inlet section and comprising:

a honeycomb panel defining a plurality of cells; and a bacteria and bacteria nutrient composition packed in each of said cells;

whereby said bacteria nutrient is leached from said honeycomb cell structure by the flow of said aqueous solution therethrough for subsequent bacteria induced removal of said heavy metals and sulfates from said aqueous solution in said reaction section.

* * * * *